June 24, 1930.  W. H. ROBBINS  1,766,356
POWER DRIVEN WIRE STEEL WOOL MACHINE
Filed Aug. 31, 1928   10 Sheets-Sheet 3
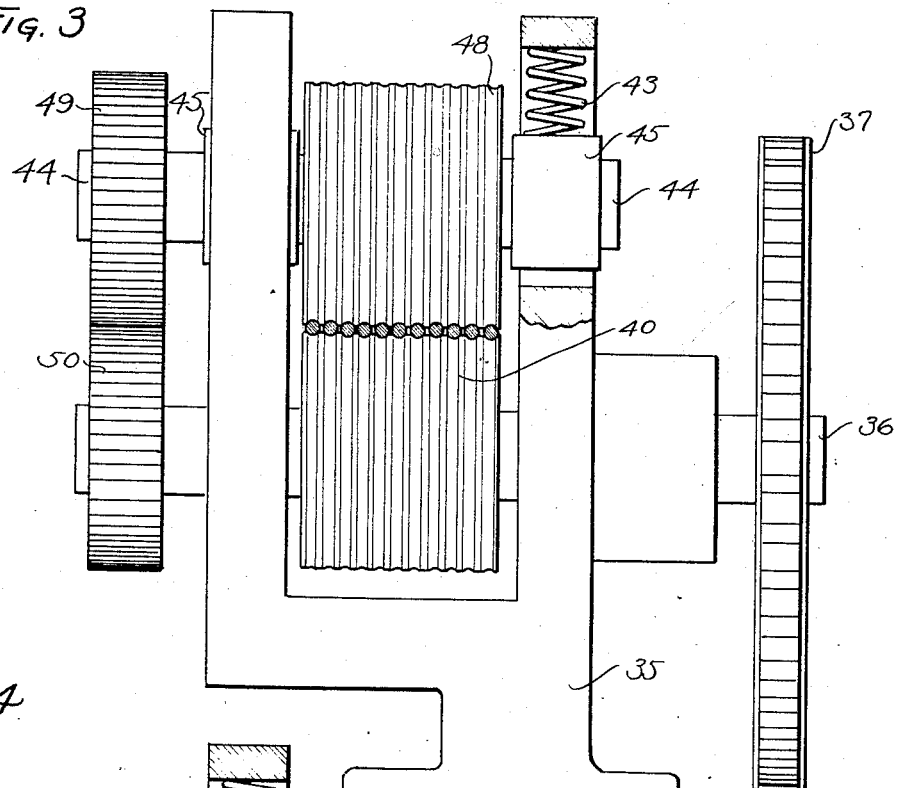
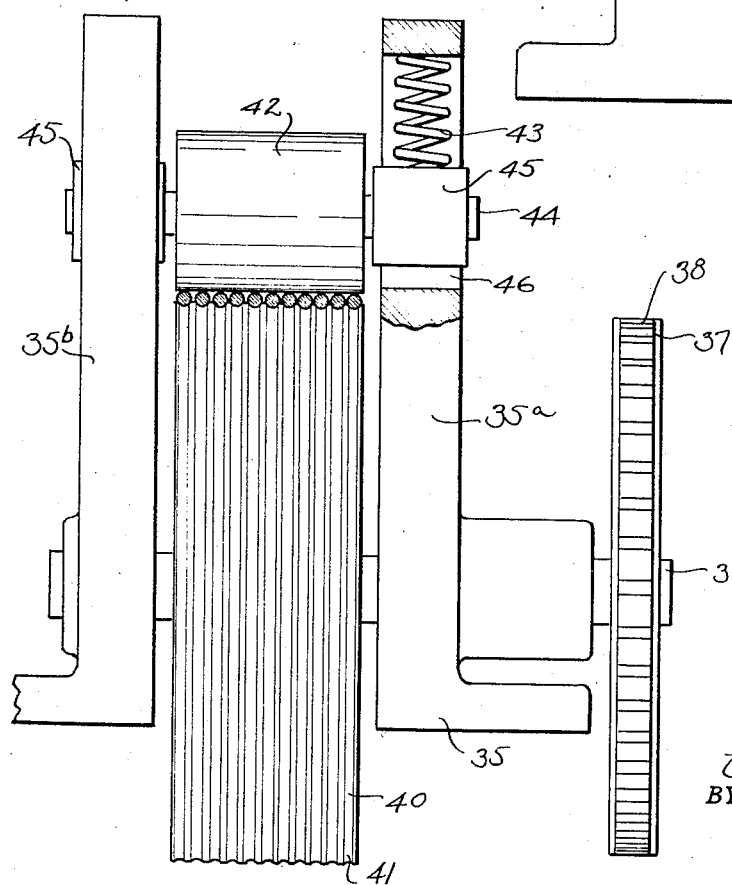
INVENTOR
William H. Robbins
BY
Toulmin & Toulmin
ATTORNEY

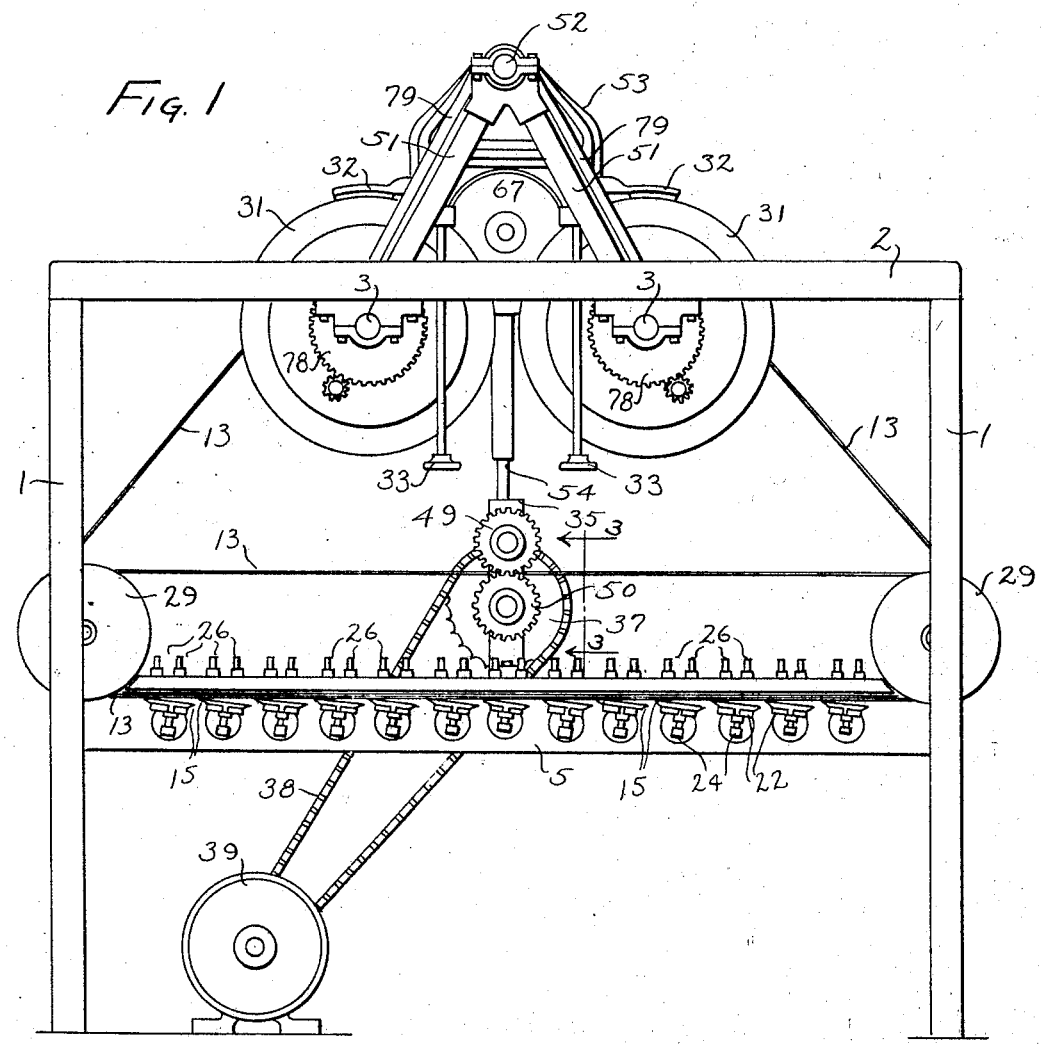

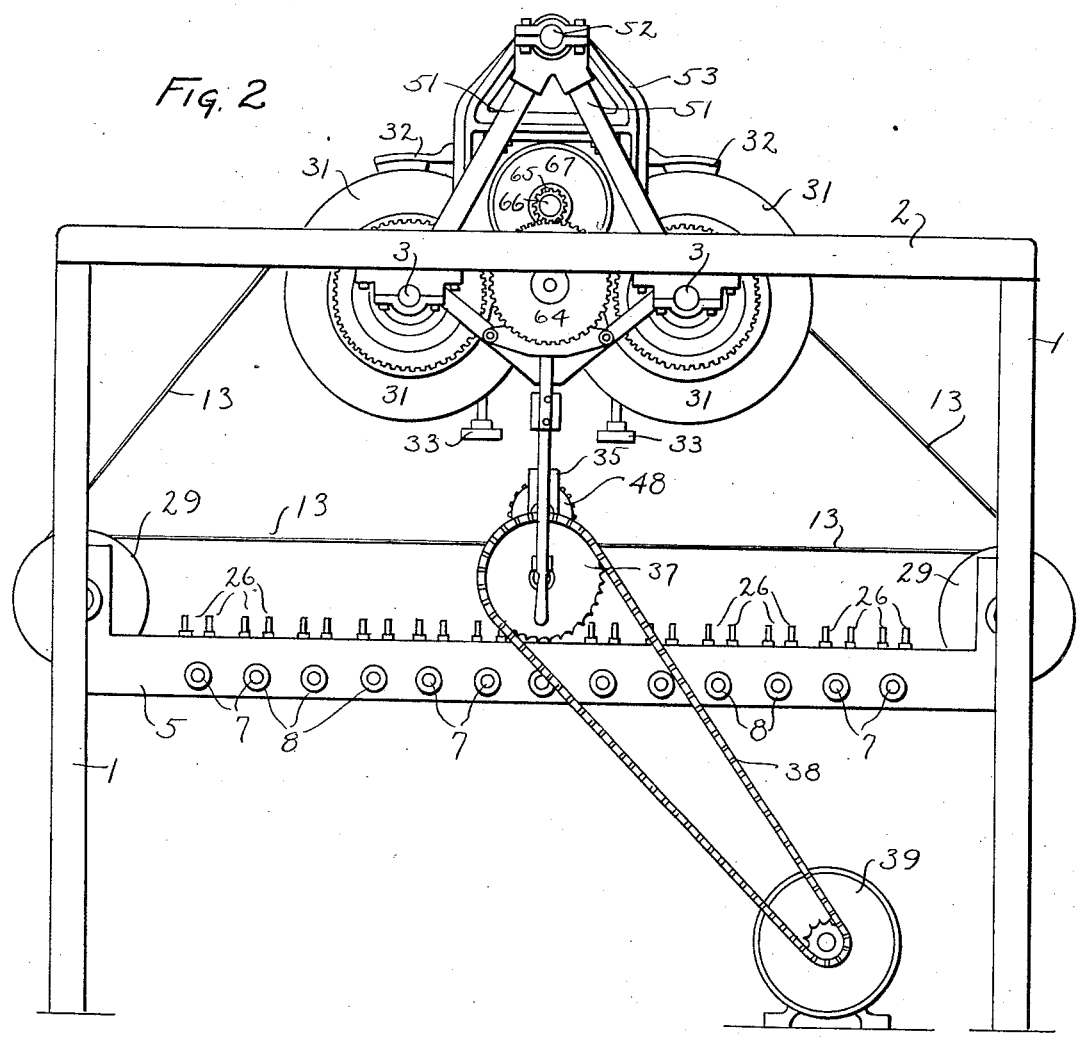

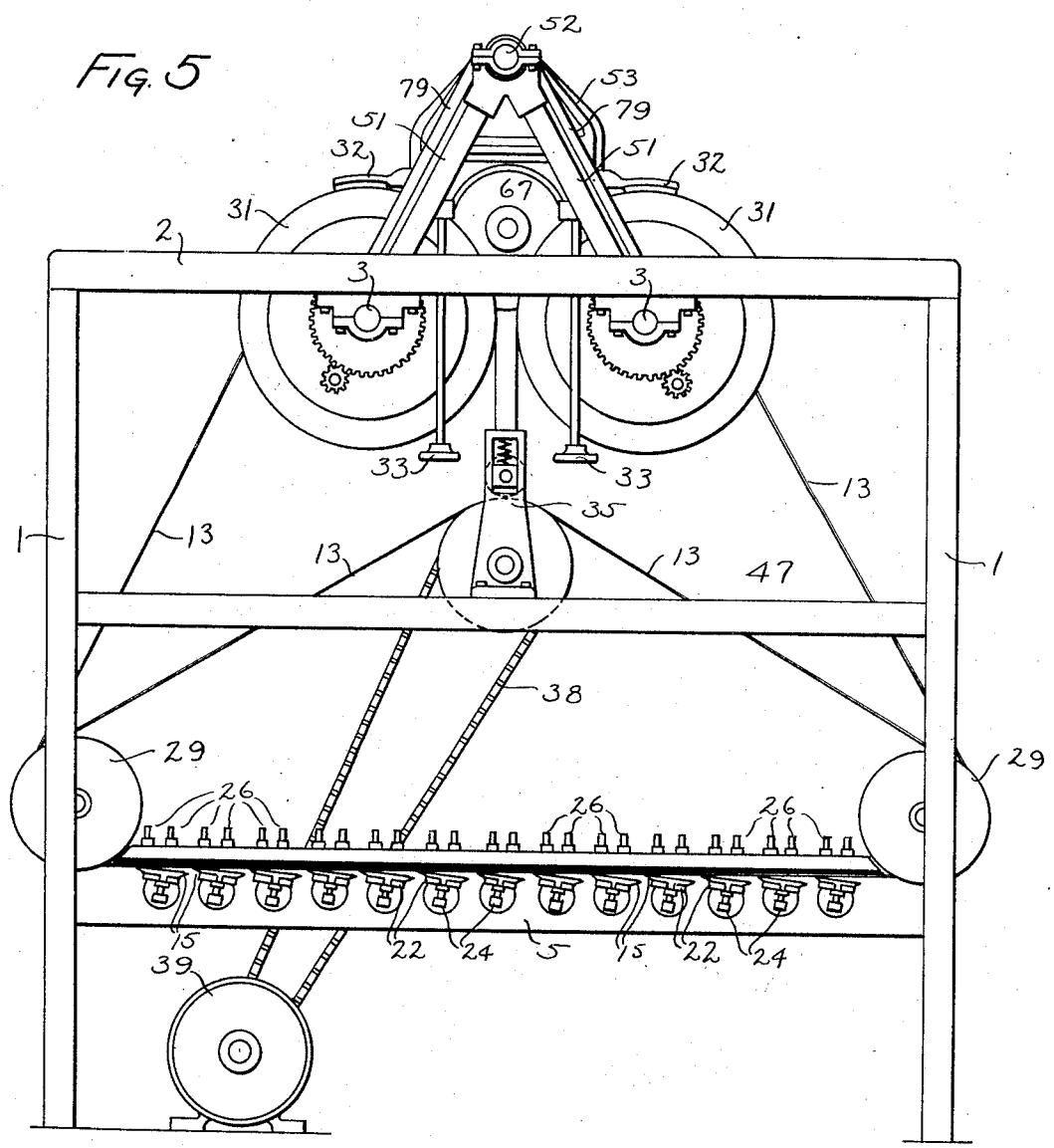

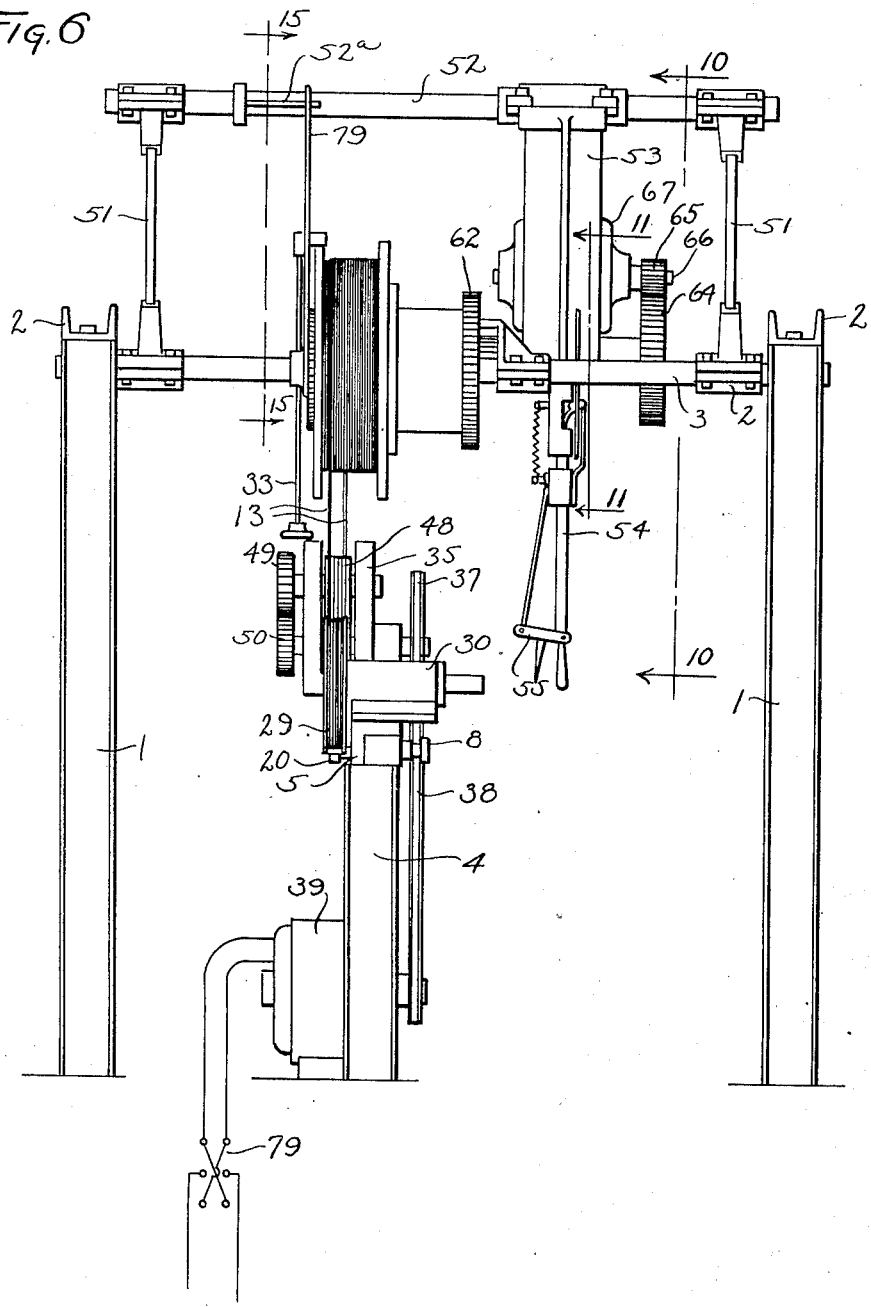

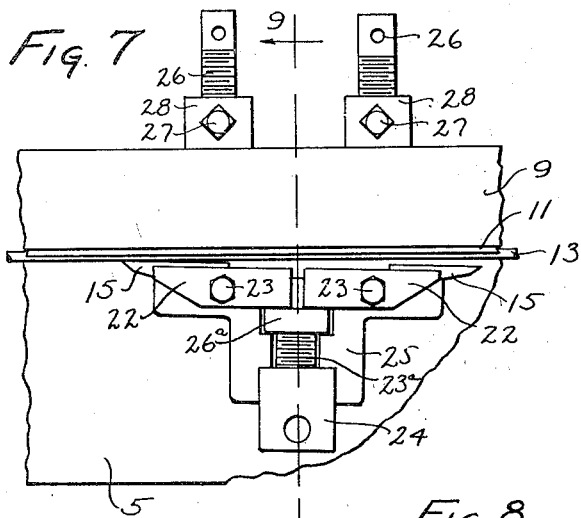
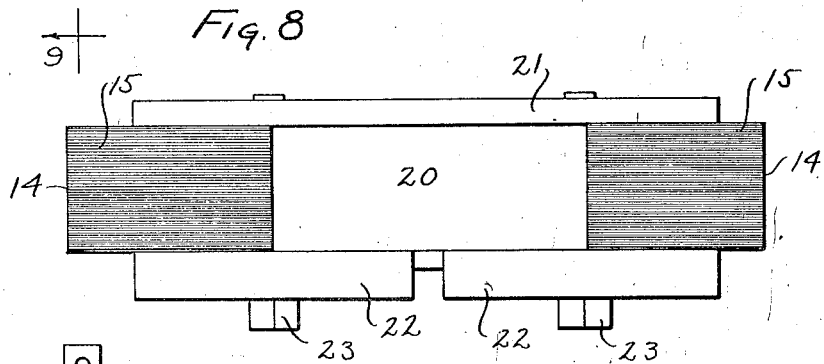
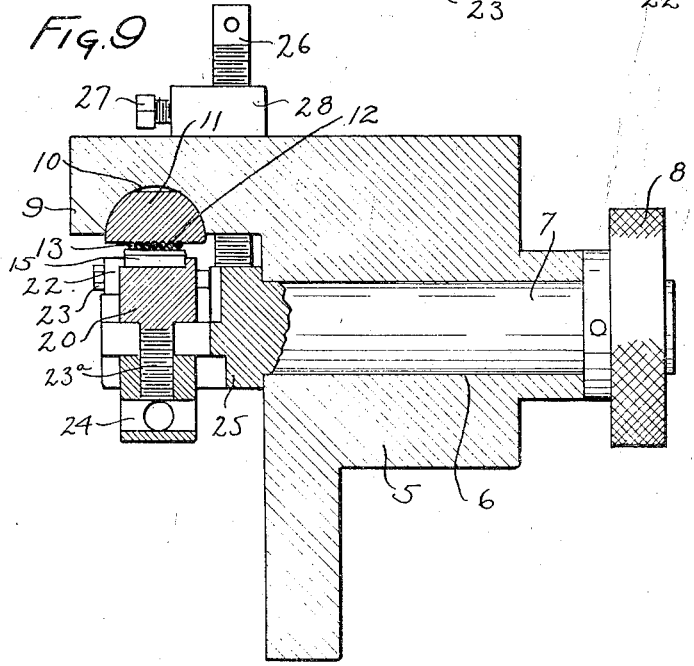

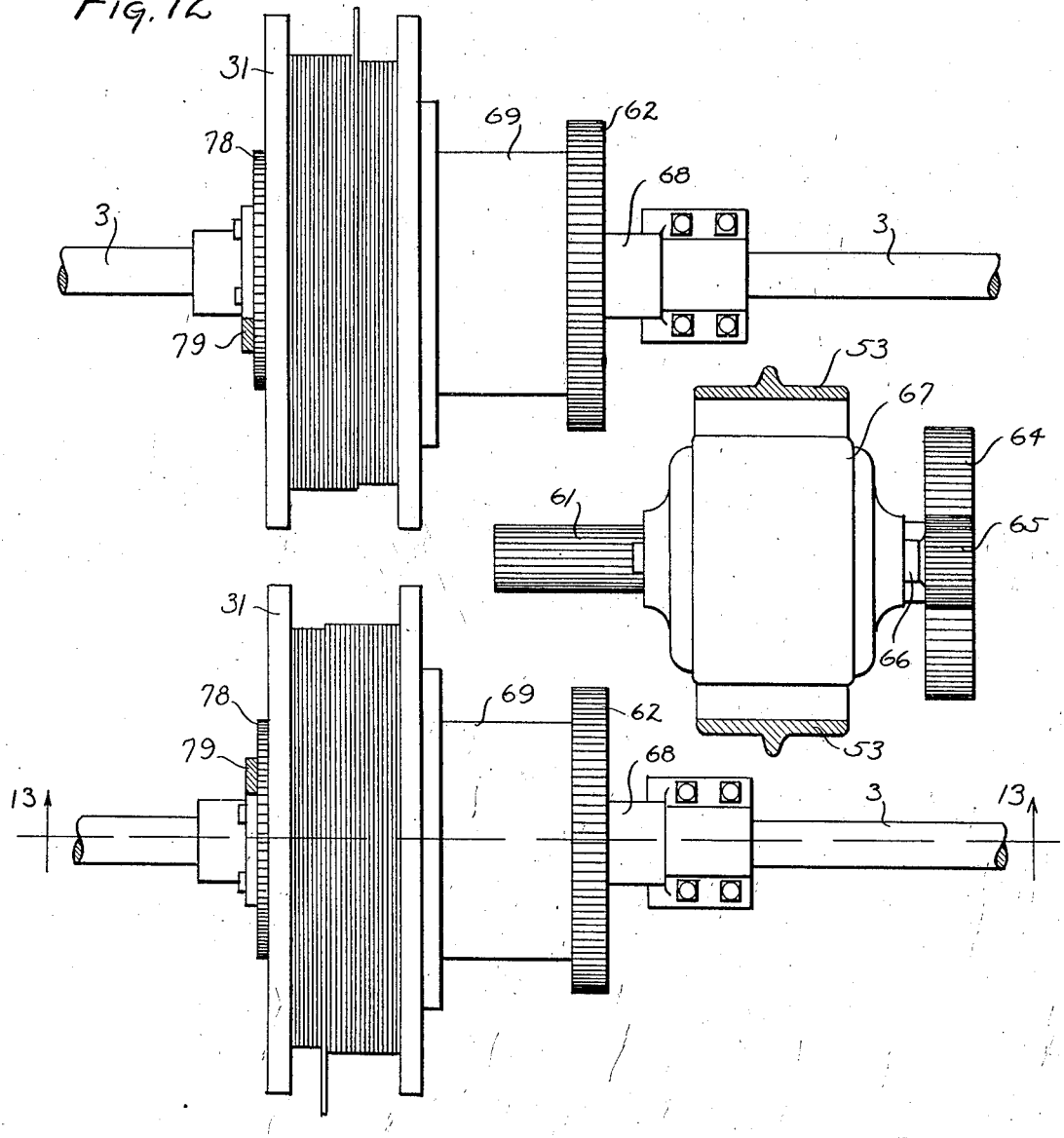

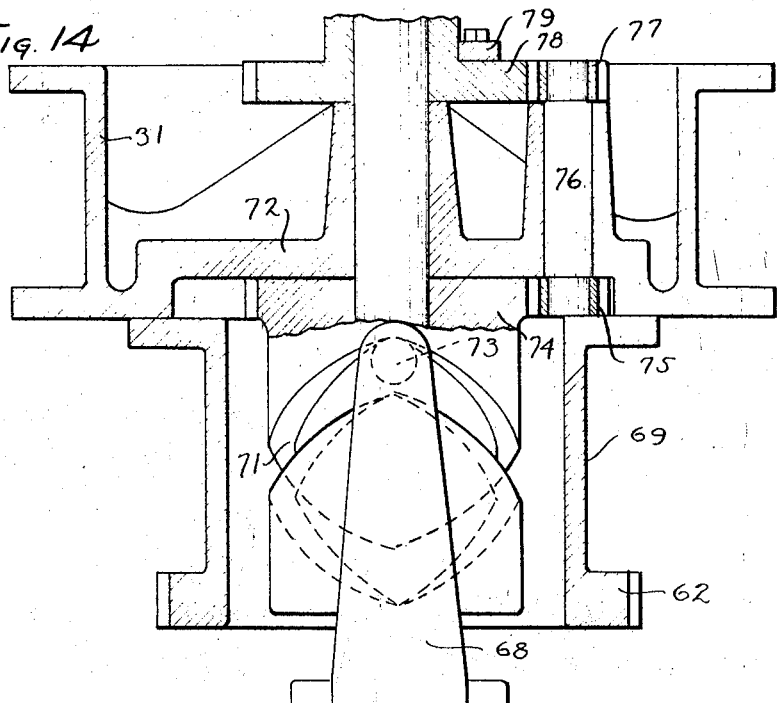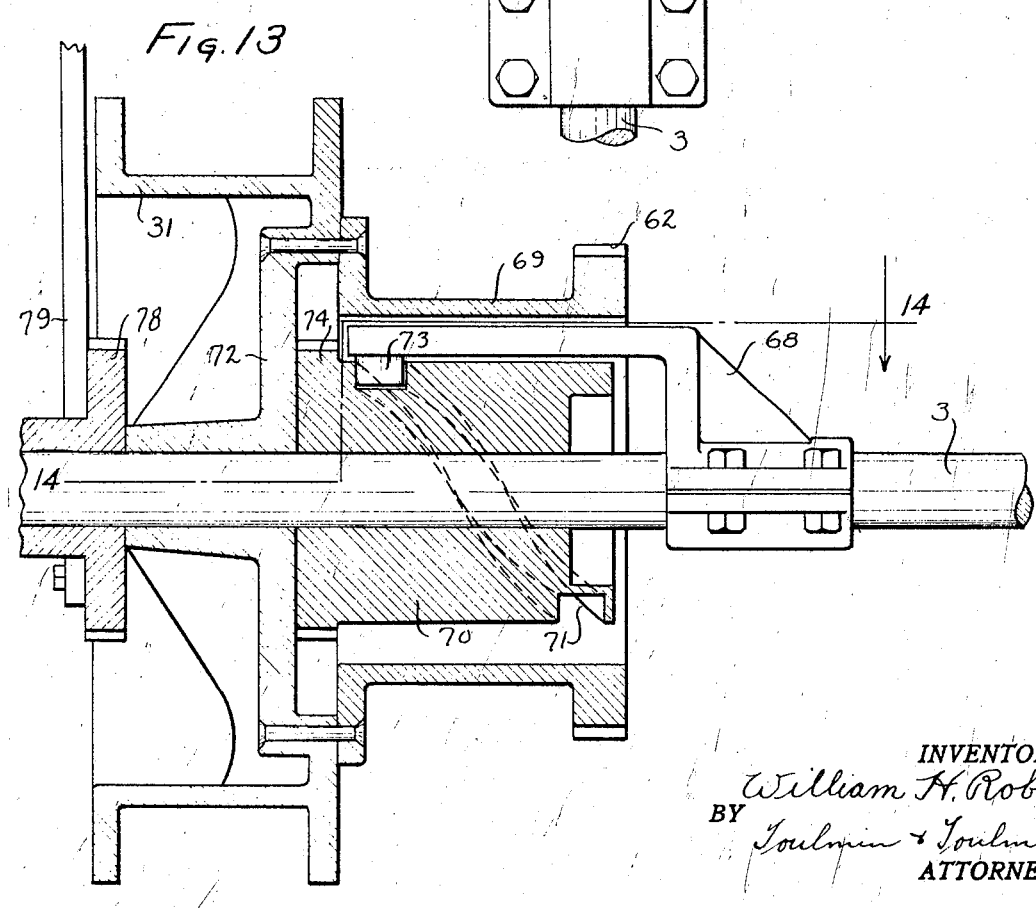

June 24, 1930.   W. H. ROBBINS   1,766,356
POWER DRIVEN WIRE STEEL WOOL MACHINE
Filed Aug. 31, 1928   10 Sheets-Sheet 10
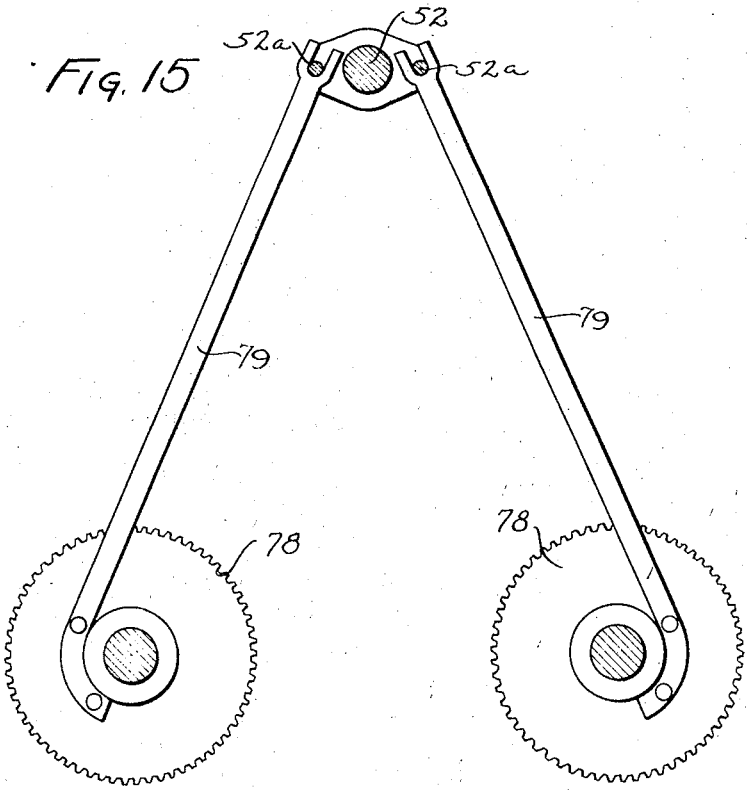
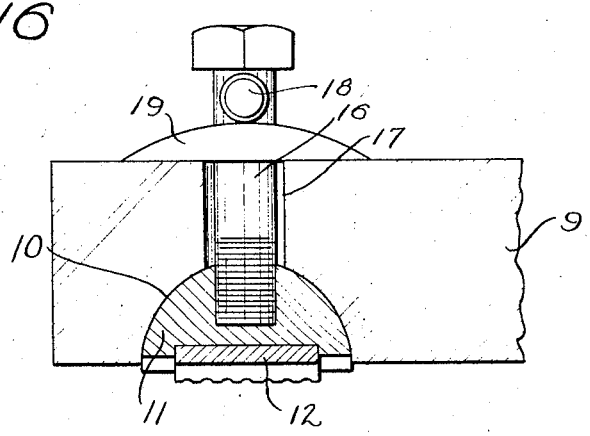
INVENTOR
William H. Robbins
BY Toulmin + Toulmin
ATTORNEY Patented June 24, 1930

1,766,356

UNITED STATES PATENT OFFICE

WILLIAM H. ROBBINS, OF SPRINGFIELD, OHIO, ASSIGNOR TO THE WILLIAMS COMPANY, OF LONDON, OHIO, A CORPORATION OF OHIO

POWER-DRIVEN WIRE-STEEL-WOOL MACHINE

Application filed August 31, 1928. Serial No. 303,248.

My invention relates to steel wool machines.

It is the object of my invention to provide a steel wool machine in which the strain on the wire will be so reduced as to prevent its breaking and to insure its uniform feed, while at the same time permitting of the use of a plurality of loops of wire on which one tool either operates on a single loop or the same tool will operate on a plurality of loops.

It is my further object to eliminate the necessity for driving the sheaves over which the wire is looped and to thereby simplify the construction of the machine. By eliminating this driving mechanism of the sheaves I am enabled to remove the mechanism over the bed of the machine, making the machine easier to operate.

It is a further object of my invention to provide a machine which will be reversible, so that when the wires are run through the machine completely in one direction, it may be reversed and moved in the other direction, so that it will be cut down to its smallest form.

Referring to the drawings,

Figure 1 is a front elevation of the machine.

Figure 2 is a rear elevation thereof.

Figure 3 is a section on the line 3—3 of Figure 1.

Figure 4 is a similar section showing a modified form of the machine.

Figure 5 is a front elevation of the machine with a modified form of the wire drive shown in Figure 4.

Figure 6 is an end elevation of the machine.

Figure 7 is a detail side view of the tool holder and tool cutter.

Figure 8 is a plan view thereof.

Figure 9 is a section on the line 9—9 of Figure 7.

Figure 12 is a partial top plan view of Figure 1, showing the driving mechanism for the winding and unwinding mechanism in neutral position.

Figure 13 is a section on the line 13—13 of Figure 12 showing the means for moving one of the winding drums progressively, inwardly and outwardly.

Figure 14 is a horizontal section on the line 14—14 of Figure 13.

Figure 15 is a section on the line 15—15 of Figure 6, showing the mechanism for maintaining certain of the gears in stationary position.

Figure 16 is a section showing the manner of supporting the guides for the strands.

Figure 10:
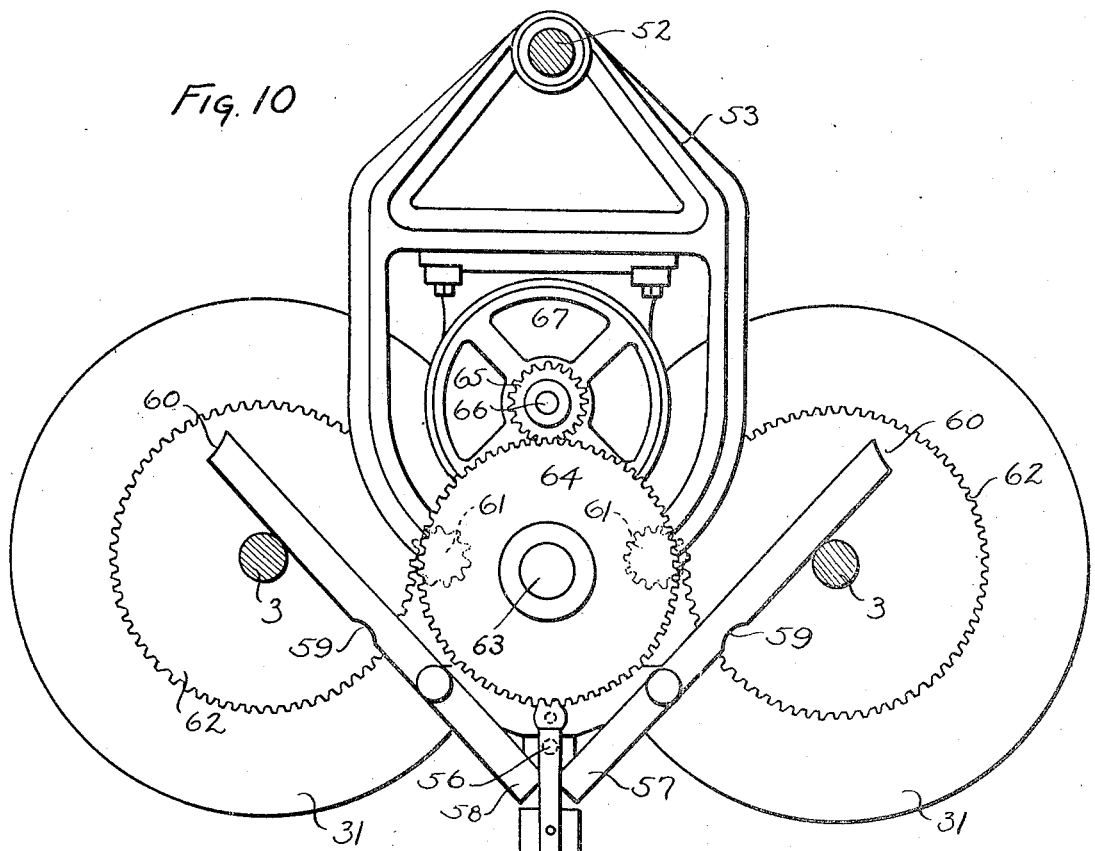
Figure 10 is a section on the line 10—10 of Figure 6 showing the driving mechanism in neutral position.
Figure 11:
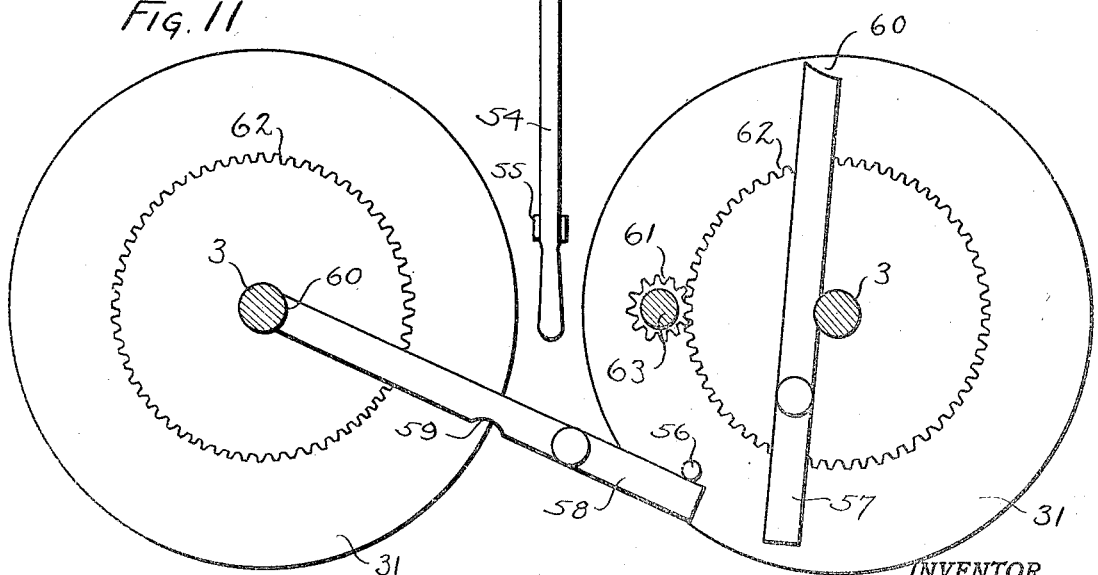
Figure 11 is a section on the line 11—11 of Figure 6 showing the parts diagrammatically in operative position of the winding and unwinding mechanism.

Referring to the drawings in detail, 1 indicates four uprights constituting the supporting portion of the frame of the machine. These uprights may be either channel members, I-beams or cast columns. They support horizontal frame members 2 and are interconnected fore and aft by the shafts 3, the purpose of which will be hereinafter described.

The cutting machine proper has its own independent frame consisting of vertical and supporting members 4 and a cutting table 5. This table 5 is provided with a plurality of horizontally disposed apertures 6 for receiving tool holder shafts 7, these shafts being adapted to be rotated by hand wheels 8. The table itself is provided on its upper front face with an overhanging eldge 9 that has its under surface cut away in an arcuate groove 10 for receiving a rocking wire guide 11 that is provided on its lower face with a plurality of grooves 12, in which the loops of wire 13 travel. By having this rocking guide the size of the wires as they are cut is accommodated so that a flat surface in a uniform plane is presented to the cutting tool edge 14 of the cutting tool 15.

These guides 11 are supported on pins 16 which project through the ledge 9 of the table 5. These pins move into the slot 17 of the table ledge 9 and are supported for this rocking movement by rollers 18 traveling on a rocking surface 19, mounted on the top of the ledge 9.

The tool holder itself consists of a horizontal bed member 20 having a tool side wall engaging shoulder 21 that is stationary, and a removable shoulder 22 which is adapted to clamp the other side of the tool 15 by reason of the clamping action of the retaining bolts 23. This tool holder is adjustably mounted by the screw 23ª and the nut 24 upon the supporting shaft 7. This supporting shaft 7 terminates in a supporting head 25 that extends laterally along the face of the table 5, and outwardly into a ledge 26ª through which the adjusting screw 23ª projects, and upon which the tool holder 20 rests.

In order to determine the angularity of the tool holder and its tool with respect to the wire 13, spaced set screws 26 are provided engaging either end of the bracket 25 where these screws are carried by the ledge 9, and maintained in adjusted position by the set screws 27 and collars 28, so that it is possible to fix the exact angularity of the tool holder and tools with respect to the wire 13 and thereby control which one of the tools will engage the wire, depending upon the direction of the wire.

These tools are located beneath the ledge 9 so that the strands of steel wool cut from the wire may be conveniently removed therefrom.

It will be observed that the wire 13 is arranged in a plurality of loops upon the idler sheaves 29 which are rotatably supported in bearing boxes 30 on either end of the bed 5. The free ends of the wire 13 are conveyed to drums 31 that are alternately used as winding and unwinding drums. While one drum is winding the other is unwinding. By use of brake 32 controlled by brake levers 33 and the use of a winding variable speed motor 67, a uniform tension is maintained on the wire. This mechanism will be explained hereinafter in detail.

*Wire driving mechanism*

In order to relieve the strain on the wire so that the entire pull against the tools for winding purposes will not be taken upon the single strand of wire, I provide the following mechanism.

A bracket 35 is mounted upon the tool bed 5. This bracket is provided with upstanding arms 35ª and 35ᵇ. In the lower part of the arms is journalled a drive shaft 36 on which is mounted a sprocket 37 driven by a chain 38 from a motor 39. If desired the motor may be directly connected to the shaft 36, but for the purpose of clearness I have shown the typical arrangement indicated on the drawings.

On this shaft 36 between the arms 35ª and 35ᵇ is mounted a grooved driving drum 40 having a plurality of grooves 41 for receiving the loops of wire as they pass over the top of the table. In some instances it may be found necessary to provide means on top of these loops of wire for maintaining them in the grooves. If such a means is desired I provide a flat surface roller 42 which is spring pressed in position by the spring 43 engaging the ends of the roller shaft 44 on the blocks 45, which blocks are guided in grooves 46 in the upper ends of the arms 35ª and 35ᵇ. Thus any size of wire will be accommodated by the roller which may rock laterally.

While I have shown for the purpose of clearness in Figures 3 and 4 the wires of the same uniform section, yet in practice they will not remain in uniform section as each one will be varied from the other, due to the fact that they do not have the same amount of wire cut from them as the cutting progresses, but due to the smallness of the drawing it is difficult to show this fine variation in the size of wire.

Thus, by my mechanism, I am enabled to apply the driving sheave to each of the loops of the wire independently of the other loops to synchronize their movement by a common application of power at a common location. I have eliminated the necessity for driving the end sheaves with the complication of gearing, shafting and motor and secure a new and improved function in that I do not have to synchronize the pull on the remote places which sometimes results in the fracturing of the wires because if there is wear on the gears, motor, shafting and the like, one sheave may be driven at a different rate from the other sheave, and thereby put an unnecessary strain upon the loops of wire and bring about an irregular chattering movement which is not desirable when making uniform grades of wool.

By having a single point to the application of the power, the necessity for synchronization has been eliminated and I am enabled to secure an improved result. In the modified form shown in Figure 4 and further illustrated in Figure 5 I provide an extra frame member 47 in case it is not desired to put the modified form directly on the tool bed 5. Either way may be followed.

The particular different feature of this modification is the utilization of a grooved upper roller 48 in place of the smooth roller 42. It is otherwise spring pressed in position and the shaft 44 of the grooved roller 48 is driven by the gear 49 meshing with the driving gear 50 on the shaft 36, so that the amount of surface engaged by the driving mechanism is substantially doubled.

The two rollers 40 and 48 are synchronized in their movement by the gears 49 and 50 and the power so applied to the loops of wire so that no pulling or stretching of the wire will take place. Thus the advantages of a duo drive, closely adjacent to one another, applying the drive to substantially the same area of the wire, is secured.

Winding and unwinding mechanism

Any form of winding and unwinding mechanism may be employed. I have shown one form which I have found to be successful, but it forms no part individually of the present invention. It is merely shown and described for the purpose of showing a completely operative machine.

I provide inverted V-shaped members 51 mounted on the upper frame member, supporting at either end the shaft 52. On this shaft 52 is a cradle 53 adapted to swing back and forth by reason of a lever 54 which depends from the bottom of the cradle within reach of the operator. This arm 54 carries a hand operated latch mechanism 55 which is adapted to actuate the lower ends of either one of the locking levers 57 and 58, which have locking notches 59 for engaging with the shafts 3 of the winding and unwinding drums 31. The ends of these levers are also provided with locking notches 60 for cooperating in this locking arrangement.

By operating the hand operated structure 55 either one of these locking levers can be unlocked. When the operator swings the cradle to either side the notch 59 will engage the other shaft 3 on the other side. This results in placing the pinion 61 in engagement with the gear 62 on the shaft 3 which will convert one of the drums 31 into a winding drum while the other drum 31 will be an unwinding drum. As the free ends of the wire are wound on these respective drums, the brake 32 heretofore described will engage the flange of the drum and prevent it from unwinding too rapidly.

Pinion 61 is a long pinion and is mounted so that it will engage with the gears 62 as they move in and out in order to wind the wire evenly on the drums and evenly unwind it. The mechanism for this purpose will be described hereinafter. Pinion 61 is mounted upon the shaft 63. This shaft carries on its other end a gear 64 which is in turn driven by the pinion 65 on the armature shaft 66 of a variable speed motor 67.

I utilize a variable speed motor in order to accommodate the varying strain upon the wire, the varying speed being necessary due to the difference in size of the drum of wire as it is wound and unwound.

Referring to the means for moving the drum inwardly and outwardly and uniform winding and unwinding, this mechanism will be shown particularly in Figure 13. The shaft 3 has mounted thereon an arm 68 that projects laterally along the arm in spaced relationship thereto within the housing 69 carrying the gear 62, and above a cam 70 and a cam groove 71. This cam is loosely mounted upon the shaft 3 and has one end thereof abutting against the supporting flange 72 of the drum 31. The arm 68 has a depending cam roller 73 working in the cam groove 71. As the drum rotates, it is thereby caused to reciprocate on the shaft 3 with respect to the other shaft 3, stationary arm 68 and stationary depending cam roller 73. The inner end of the drum 70 is provided with a gear 74 that in turn meshes with a pinion 75 carried on a pinion shaft 76, the other end of which carries a pinion 77 engaging with a gear 78. This gear is a non-operative gear, being held in non-operative position by the arm 79 which is slidably mounted at its upper end upon the shaft 52.

It will be understood that the entire mechanism consisting of the gearing, cam member and drum will be moved slowly backwardly and forwardly for the winding of the wire and the unwinding thereof.

In laying out the cam groove I find it desirable to extend the groove from a point near the front end of the cam 70 to a point on the rear end on the other side of the cam and thus continuing around and back in a like manner to the place of starting the groove. This groove is equal in length to the circumference of the cam added to double the width of the face of the drum 31 between its flanges. The motor used for this driving operation of winding has a capacity of approximately double the power necessary for operating the drums. This gives sufficient power to keep a tension on the wire. It thus cooperates with the driving roll or roller in driving the last loop of wire across the cutting knives. The motor used for driving the rollers may be a constant speed motor.

When it is desired to reverse the direction of the driving means, I provide the usual switch 79 which reverses the direction of the motor 39, or any suitable reversing clutch may be employed if the motor is a constant speed motor.

It will be understood that I desire to comprehend within my invention all the modifications necessary to adapt it to varying conditions and uses.

Having thus fully described my invention what I claim as new and desire to secure by Letters Patent is:

1. In a steel wool machine, means for supporting a loop of wire, means for maintaining said wire under tension in a looped condition, means for cutting said wire and means for driving the wire independently of the means for maintaining it under tension, said driving means being located between the looped supports.

2. In a steel wool machine, means for supporting a loop of wire, means for maintaining said wire under tension in a looped condition, means for cutting said wire, means for driving the wire independently of the means for maintaining it under tension, said driving means being located between the looped supports, and means for causing said wire loop to engage a driving means.

3. In a steel wool machine, means for supporting a loop of wire, means for maintaining said wire under tension in a looped condition, means for cutting said wire, means for driving the wire independently of the means for maintaining it under tension, said driving means being located between the looped supports, and means for causing said wire loop to engage a driving means, said last mentioned means consisting of a second driving means engaging the opposite side of the loop.

4. In a steel wool machine, means for supporting a loop of wire, means for maintaining said wire under tension in a looped condition, means for cutting said wire, means for driving the wire independently of the means for maintaining it under tension, said driving means being located between the looped supports, and means for causing said wire loop to engage a driving means, said last mentioned means consisting of a second driving means engaging the opposite side of the loop and super-imposed thereon.

5. In a steel wool machine, means for supporting a loop of wire, means for maintaining said wire under tension in a looped condition, means for cutting said wire, means for driving the wire independently of the means for maintaining it under tension, said driving means being located between the looped supports, and means for causing said wire loop to engage a driving means, said last mentioned means consisting of a second driving means engaging the opposite side of the loop and superimposed thereon, said driving means being adapted to be driven synchronously on opposite sides of the strand forming the loop of wire.

6. In a steel wool machine having a single strand of wire arranged in a plurality of loops, means for supplying said wire and taking it up to keep it under tension, idler means at either end of the loops for supporting them in predetermined position, means independent of said idler means for engaging all of said loops and driving them synchronously from a common point of the application of the power, means for maintaining said loops of wire in engagement with the driving means, said driving means consisting of a second driving means oppositely disposed from the first driving means and engaging the other sides of the loops of wire, means for yieldingly accommodating the varying sizes of the wire passing between said driving means, and means for driving said driving means synchronously.

7. In a steel wool machine having a single strand of wire arranged in a plurality of loops, means for supplying and taking up the wire under tension, idler sheaves for supporting the ends of the loops, an intermediate grooved driving sheave adapted to engage the loops of wire, means for driving said grooved driving sheave and means for driving the means for taking up the free end of the wire.

8. In a steel wool machine having a single strand of wire arranged in a plurality of loops, means for supplying and taking up the wire under tension, idler sheaves for supporting the ends of the loops, an intermediate grooved driving sheave adapted to engage the loops of wire, means for driving said grooved driving sheave, means for driving the means for taking up the free end of the wire, and a spring pressed roller super-imposed upon said loops of wire above the point of application thereof to the grooved driving sheave.

9. In a steel wool machine having a single strand of wire arranged in a plurality of loops, means for supplying and taking up the wire under tension, idler sheaves for supporting the ends of the loops, an intermediate grooved driving sheave adapted to engage the loops of wire, means for driving said grooved driving sheave, means for driving the means for taking up the free end of the wire, and a spring pressed roller super-imposed upon said loops of wire above the point of application thereof to the grooved driving sheave, said roller being adapted to rock laterally to accommodate the varying diameters of the respective loops of wire.

10. In a steel wool machine having a single strand of wire arranged in a plurality of loops, spaced idler sheaves for supporting said loops of wire, means for supplying and taking up said wire at its free ends and maintaining it under tension on its sheaves, a grooved driving drum located between said sheaves, means for cutting wool from said loops of wire, oppositely disposed from the driving means, and a second grooved driving means, super-imposed on the first grooved driving means engaging opposite sides of the loops of wire whereby the two driving means have their power applied in substantially the same area of the loops of wire.

11. In a steel wool machine having a single strand of wire arranged in a plurality of loops, spaced idler sheaves for supporting said loops of wire, means for supplying and taking up said wire at its free ends and maintaining it under tension on its sheaves, a grooved driving drum located between said sheaves, means for cutting wool from said loops of wire oppositely disposed from the driving means, a second grooved driving means super-imposed on the first grooved driving means engaging opposite sides of the loops of wire whereby the two driving means have their power applied in substantially the same area of the loops of wire, and means for synchronizing the driving of said super-imposed driving means.

12. In a steel wool machine having a single strand of wire arranged in a plurality of loops spaced idler sheaves for supporting said loops of wire, means for supplying and taking up said wire at its free ends and maintaining it under tension on its sheaves, a grooved driving drum located between said sheaves, means for cutting wool from said loops of wire oppositely disposed from the driving means, a second grooved driving means super-imposed on the first grooved driving means engaging opposite sides of the loops of wire whereby the two driving means have their power applied in substantially the same area of the loops of wire, means for synchronizing the driving of said super-imposed driving means, and means for yieldingly maintaining said driving means in contact with said loops of wire.

13. In a steel wool machine having a single strand of wire arranged in a plurality of loops, spaced idler sheaves for supporting said loops of wire, means for supplying and taking up said wire at its free ends and maintaining it under tension on its sheaves, a grooved driving drum located between said sheaves, means for cutting wool from said loops of wire oppositely disposed from the driving means, a second grooved driving means super-imposed on the first grooved driving means engaging opposite sides of the loops of wire whereby the two driving means have their power applied in substantially the same area of the loops of wire, means for synchronizing the driving of said super-imposed driving means, means for yieldingly maintaining said driving means in contact with said loops of wire, and means for permitting of the movement of the driving means with respect to one another to accommodate variations in cross section of the loops of wire with respect to one another.

14. In a steel wool machine having a single strand of wire arranged in a plurality of loops, means for supplying and taking off wire from the machine and maintaining it under tension, a variable speed motor for driving said means, means for supporting said loops on idlers, means for driving said wire by engaging all of said loops through a common driving means between said idlers, and means for cutting wool from said loops of wire.

15. In a steel wool machine having a single strand of wire arranged in a plurality of loops, means for supplying and taking off wire from the machine and maintaining it under tension, a variable speed motor for driving said means, means for supporting said loops on idlers, means for driving said wire by engaging all of said loops through a common driving means between said idlers, means for cutting wool from said loops of wire, means for reversing the direction of the wire and means for reversing the cutting means of the wire.

16. In a steel wool machine having a single strand of wire arranged in a plurality of loops, means for supplying and taking off wire from the machine and maintaining it under tension, a variable speed motor for driving said means, means for supporting said loops on idlers, means for driving said wire by engaging all of said loops through a common driving means between said idlers, means for cutting wool from said loops of wire, means for reversing the direction of the wire and means for reversing the cutting means of the wire, and means for reversing the direction of the driving means on the loops of wire.

In testimony whereof, I affix my signature.

WILLIAM H. ROBBINS.